(12) United States Patent
Topaltzas (10) Patent No.: US 7,957,731 B2
(45) Date of Patent: Jun. 7, 2011

(54) SYSTEM AND METHOD FOR DETERMINING MOBILE TELEPHONE VOICE QUALITY IN A LIVE NETWORK

(75) Inventor: Dimitrios M. Topaltzas, Ellicott City, MD (US)

(73) Assignee: Metrico Wireless, Inc., Frederick, MD (US)

( * ) Notice: Subject to any disclaimer, the term of this patent is extended or adjusted under 35 U.S.C. 154(b) by 743 days.

(21) Appl. No.: 12/037,310

(22) Filed: Feb. 26, 2008

(65) Prior Publication Data
US 2009/0215444 A1 Aug. 27, 2009

(51) Int. Cl.
*H04M 4/00* (2006.01)

(52) U.S. Cl. .................. 455/423; 455/422.1; 455/67.11

(58) Field of Classification Search ............. 455/422.1, 455/423, 67.11, 424, 425, 428, 445; 379/10, 379/10.01, 13, 15.01, 27.01, 26.01, 29.01; 370/241, 241.1
See application file for complete search history.

(56) References Cited

U.S. PATENT DOCUMENTS

| | | | |
|---|---|---|---|
| 5,644,623 A | 7/1997 | Gulledge | |
| 5,794,128 A | 8/1998 | Brockel et al. | |
| 5,848,384 A | 12/1998 | Hollier et al. | |
| 5,987,320 A | 11/1999 | Bobick | |
| 5,999,900 A * | 12/1999 | Hollier | 704/228 |
| 6,038,452 A | 3/2000 | Strawczynski et al. | |
| 6,169,896 B1 | 1/2001 | Sant et al. | |
| 6,275,797 B1 | 8/2001 | Randic | |
| 6,308,065 B1 | 10/2001 | Molinari et al. | |
| 6,330,428 B1 | 12/2001 | Lewis et al. | |
| 6,603,966 B1 | 8/2003 | Sheffield | |
| 6,721,541 B1 | 4/2004 | Kingsley | |
| 6,819,924 B1 | 11/2004 | Ma et al. | |
| 7,024,161 B1 | 4/2006 | LaMedica, Jr. | |
| 7,218,895 B1 | 5/2007 | Raghavan | |
| 2001/0031625 A1 | 10/2001 | Lynn | |
| 2001/0034225 A1 | 10/2001 | Gupte et al. | |

(Continued)

FOREIGN PATENT DOCUMENTS

JP 2001/036945 2/2001

(Continued)

OTHER PUBLICATIONS

"IEEE Recommended Practice for Speech Quality Measurements", *IEEE Transactions on Audio and Electroacoustics*, (Sep. 1, 1969).

(Continued)

*Primary Examiner* — Kamran Afshar
(74) *Attorney, Agent, or Firm* — Mel Barnes; Capital Legal Group, LLC (57) ABSTRACT

A system and method for determining the quality of communications provided by a plurality of mobile telephones is provided. The method may comprise, for example, receiving one or more telephone voice signals from each mobile telephone; storing the one or more telephone voice signals in a memory; concurrently with aid receiving telephone voice signals from a mobile telephone, receiving one or more reference device voice signals from a reference device substantially co-located with the mobile telephone; storing the one or more reference device voice signals in a memory; determining voice quality data for the telephone voice signals; determining voice quality data for the reference device voice signals concurrently received with the telephone voice signals; and normalizing the voice quality data of the telephone voice signals from each mobile telephone based on the voice quality data of the reference device voice signals concurrently received with the telephone voice signals.

25 Claims, 3 Drawing Sheets

U.S. PATENT DOCUMENTS

| | | |
|---|---|---|
| 2002/0028659 A1 | 3/2002 | Adams et al. |
| 2002/0072358 A1 | 6/2002 | Schneider et al. |
| 2002/0127993 A1* | 9/2002 | Zappala .................. 455/404 |
| 2002/0131604 A1 | 9/2002 | Amine |
| 2003/0032448 A1 | 2/2003 | Bulthuis et al. |
| 2003/0069011 A1 | 4/2003 | Bonnifait et al. |
| 2003/0134631 A1 | 7/2003 | Snyder et al. |
| 2004/0059572 A1 | 3/2004 | Ivanic et al. |
| 2004/0071084 A1 | 4/2004 | El-Hennawey et al. |
| 2004/0073424 A1 | 4/2004 | Geppert et al. |
| 2005/0013444 A1 | 1/2005 | Dorfman et al. |
| 2005/0015253 A1 | 1/2005 | Rambo et al. |
| 2005/0047615 A1 | 3/2005 | Kawamura et al. |
| 2005/0059349 A1 | 3/2005 | Elliott |
| 2005/0287954 A1 | 12/2005 | Lim |
| 2006/0008423 A1 | 1/2006 | Araya et al. |
| 2006/0046671 A1 | 3/2006 | Kondo et al. |
| 2006/0046710 A1 | 3/2006 | Lohlein et al. |
| 2006/0073786 A1 | 4/2006 | Sarkar |
| 2007/0037570 A1 | 2/2007 | Donovan et al. |

FOREIGN PATENT DOCUMENTS

| | | |
|---|---|---|
| JP | 2001/036954 | 2/2001 |
| JP | 2001/326726 | 11/2001 |

OTHER PUBLICATIONS

"Psytechnics Behind Every Word", *Pesq Tools*, (Aug. 1, 2003).

\* cited by examiner

SYSTEM AND METHOD FOR DETERMINING MOBILE TELEPHONE VOICE QUALITY IN A LIVE NETWORK

FIELD OF THE INVENTION

The present invention generally relates to systems and methods for evaluating communication devices, and more particularly to systems and methods for evaluating and comparing voice quality of mobile telephones in live networks.

BACKGROUND OF THE INVENTION

Mobile telephone devices have become ubiquitous in our society. Unlike conventional landline telephony services, which typically operate in a home or office and are delivered via a wire and enjoy a highly consistent transmission medium, mobile telephone devices are subjected to use under varying radio environments which result in a highly varying speech quality to the end user. One challenge to those designing mobile telephone devices is to design the telephone devices to provide the desired speech and data quality even when the user is using the telephone in challenging and changing radio environments. Further, wireless network operators also want the users of their network to use telephone devices that provide adequate communication quality in all radio environments to ensure that the user has a satisfactory experience using their wireless network. Thus, there are numerous parties who desire to test the quality of communications provided by mobile telephone devices.

There are, however, a wide variety of telephone devices used for communicating over wireless mobile telephone networks. With the proliferation of mobile telephone devices, many designs of telephones have evolved. The different designs of telephone devices result in different performance characteristics for each telephone device. Various design characteristics may impact the quality of the speech and data services provided by a telephone device and its ability to provide communications in varying radio environments. For example, the radio front-end of a telephone device, which drives, in part, the radiated performance (a devices ability to receive and transmit radio signals) of the device may positively or negatively impact the quality of communications in various radio environments. Another factor may be the device's capability to cancel interfering radio signals from wanted radio signals in order to increase the signal-to-noise ratio and thereby improve the quality of communications. Other design factors include (a) the performance of the device's digital signal processor, (b) the design of the device's operating system and associated applications including the handling of TCP/IP communication. As a result, the many different mobile telephone devices have varying performance characteristics due to their design. Thus, different telephone devices operating in the same radio environment provide different qualities of communication.

In addition, another challenge to mobile telephone device manufacturers, and to wireless carriers, is how to comparatively evaluate different model phones across different locations, at different times, and under the differing radio conditions present in live mobile networks. The present invention provides methods and systems to objectively determine the voice quality of different mobile telephones in varying environments even when tested at different times. These and other advantages may be provided by one or more embodiments of the present invention.

SUMMARY OF THE INVENTION

The present invention provides a system, product, and method for determining the quality of communications provided by a plurality of mobile telephones. In one embodiment, the method may include receiving one or more telephone voice signals from each mobile telephone over a time period at one or both of a voice server or field voice quality test equipment. Concurrently with receiving telephone voice signals from each mobile telephone, receiving one or more reference device voice signals from a reference device substantially co-located with the mobile telephone. The method further includes determining the voice quality of the telephone voice signals and the reference device voice signals concurrently received with the telephone voice signals; determining one or more telephone statistical parameters based on the voice quality of the telephone voice signals; determining one or more reference device statistical parameters based on the voice quality of the reference device voice signals concurrently received with the telephone voice signals; and normalizing the one or more telephone statistical parameters of the telephone voice signals from each mobile telephone based on the one or more reference device statistical parameters of the reference device voice signals that were concurrently received with the telephone voice signals. The statistical parameters may include (1) an average of the voice quality samples; (2) a standard deviation of the voice quality samples; (3) a mean of the voice quality samples; (4) a percentage of the voice quality samples above a threshold; and (5) a percentage of the voice quality samples below a threshold. The method may also include collecting radio parameter data during the test and comparing normalized statistical parameters of telephones tested in similar radio conditions.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, telephone devices, mobile telephones, accessory devices, simulators, ear pieces, headsets, telephone handsets, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, networks, communication systems, computers, telephone devices, mobile telephones, accessory devices, simulators, ear pieces, headsets, telephone handsets, terminals, devices, components, techniques, data and network protocols, software products and systems, development interfaces, operating systems, and hardware are omitted so as not to obscure the description of the present invention.

According to an embodiment of the present invention, the voice quality performance of a mobile telephone device, such as a mobile telephone, is evaluated in a live network. As used herein, "mobile telephone" means a telephone configured to provide voice communication services over a mobile telephone network. Other telephone devices include mobile telephone accessories (e.g., a wired or wireless) such as an earpiece, headset, speaker phone (e.g., that includes a microphone and which may be, for example, in an automobile, or other device), or other such device. A mobile telephone, also sometimes commonly referred to as a cell telephone, is a long-range, mobile electronic device used for mobile communications. In addition to providing the standard voice function of a telephone, many mobile telephones may support additional services such as SMS for text messaging, email, FTP, UDP, packet switching for access to the Internet, and MMS (Multimedia Messaging Service) for sending and receiving photos and video. A conventional mobile telephone may wirelessly communicate via a cellular network of base stations (cell sites), which is connected to the public switched telephone network (PSTN). A mobile telephone device thus may include a mobile telephone alone, or in combination with an accessory.

The present invention may be used to evaluate voice communications of mobile telephone devices for various mobile communication standards and network protocols. Voice quality may be evaluated for both transmitted and received voice communications. The mobile telephone devices under test, as well as a reference mobile telephone device (referred to as a "reference device"), are coupled to voice quality test equipment (VQTE) in the field. Calls are concurrently placed from the mobile telephone devices under test and the reference device, to a voice server. The VQTE determines the voice quality of voice communications received by the telephones under test and the reference device. The voice server determines the voice quality of communications received from the respective mobile telephone devices under test and the reference device. Bi-direction test voice communications are communicated while the devices under test and the reference device move throughout a geographical area of the live network. Thus, the voice quality may be evaluated for the devices under test and reference device at various geographic locations within one or more networks. Tests may be performed for a plurality of different telephones at different times and different locations. Various statistical parameters of a plurality of voice samples may be calculated and stored for the reference device and the one or more devices under test, including the average voice quality score, the standard deviation of the voice quality score, the percentage of voice quality scores above or below a selected performance threshold score. The statistical parameters of the voice samples of each device under test may be normalized based on the statistical parameters of the reference device that concurrently communicates voice signals to thereby normalize the test data of different telephones at different locations and under different environmental and network conditions. As a result, the performance of multiple mobile telephone devices may be meaningfully compared.

In some embodiments, a device (e.g., another mobile telephone) also may be used to determine (e.g., measure or estimate) one or more radio parameters experienced by the mobile telephone devices and reference device during the test. Such device may be coupled to radio parameter collection equipment. In some embodiments the voice quality test equipment and radio parameter collection equipment may be a computer which includes software for evaluating voice quality and receiving radio parameter data. Exemplary radio data parameters may include one or more of the following: signal to noise ratio, bit error rate, frame error rate, channel codec, received-signal level, downlink channel, channel type, handover statistics, and speech energy.

In an example method embodiment of the present invention, voice quality samples and radio parameter data may be collected while driving a vehicle in a geographical area of interest. Voice quality samples may be obtained for the device(s) under test and the reference device throughout the test at various times. A time stamp and location data may be stored in memory for each voice quality sample and periodically for each portion of radio parameter data. The time stamp may be used to select or derive radio parameter data for specific voice quality samples. In some embodiments the radio parameter data device may be from the reference device or a device under test. In other embodiments, a separate measuring device may be used.

The voice server and/or the VQTE may organize or associate the one or more normalized telephone statistical parameters based on the radio parameter data for the time period during which the telephone signals were received. The system may then provide a comparison of the normalized telephone statistical parameters that includes the normalized telephone statistical parameters grouped according to the radio conditions in which the telephone voice signals were received.

Test System Environment

Figure 1:
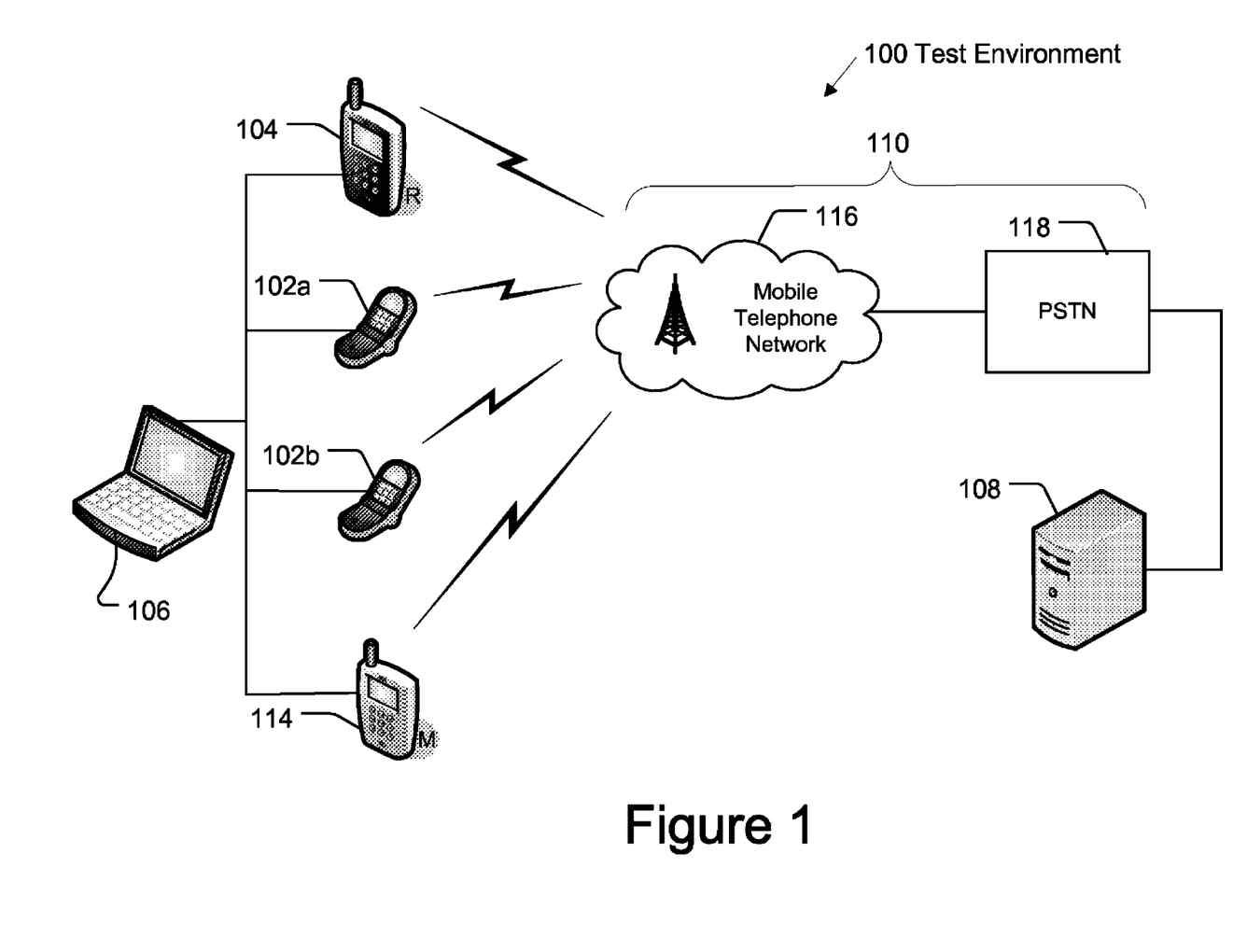
FIG. 1 is a block diagram of an example system for determining the voice quality performance provided by one or more mobile telephone devices according to an example embodiment of the present invention.

FIG. 1 shows an example embodiment of a test system environment 100 for testing one or more mobile telephone devices 102. The test system environment 100 may include a reference mobile telephone device 104 (the reference device), and one or more mobile telephone devices 102a,b to be tested (the devices under test). The reference device 104 and the devices under test 102 are electrically connected (via their headset jack) to voice quality test equipment 106. The test system environment 100 also may include a voice server 108 and communication network 110. The reference device 104 and devices under test 102 communicate with the voice server 108 through the communication network 110. In some embodiments the test system environment 100 also may include one or more devices 114 for collecting radio parameter data.

The reference device 104 may be any suitable mobile telephone device and preferably comprises the same model of telephone during all tests (but not necessarily the same physical device). The reference device 104 performs the same test procedures as the devices under test 102 and provides, in effect, a baseline for comparing performance of various devices 102 that are tested. In some implementations, different groups of mobile telephones may be tested with, and compared to, different reference devices 104. Note that although different test groups may use different reference devices 104, when any mobile telephone device is common to multiple groups, the results may be meaningfully compared for those groups (e.g., by rescaling the results using the common device as the reference device).

The VTQE 106 may comprise a laptop computer, handheld computer or other portable computing device capable of executing software to implement processes of the test scenarios. One function may include determining and storing voice quality samples, as well as determining statistical parameters (e.g., average, mean etc.) of the samples, for the reference device 104 and devices under test 102. Another function may include storing radio parameter data obtained by the collection device 114 during testing.

The voice server 108 may be a computing device executing software for performing voice server functions. For example, the voice server 108 may perform test procedures, including transmitting and receiving voice communications and scoring voice quality of received voice communications. The voice server 108 also may store voice quality samples, as well as determining statistical parameters (e.g., average, mean etc.) of the samples, for the reference device 104 and devices under test 102. obtain.

The communication network 110 includes at least a mobile telephone communication network 116. The mobile telephone network 116 may be a radio network made up of a number of radio cells (or just cells) each served by a fixed transmitter, known as a cell site or base station. These cells are used to cover different areas in order to provide radio coverage over a wider area than the area of one cell. An exemplary mobile telephone network 116 may be based on any of various telecommunication standards, such as AMPS, D-AMPS, CDMA2000, GSM, GPRS, EV-DO, UMTS, EDGE, HSCSD, HSPA, FOMA, CDMA, WiMAX, G1, G1.5, G2, and G3.

In this example, the voice server 108 is coupled to the mobile telephone network 116 via the public switched telephone network (PSTN) 118. The reference device 104 and devices under test 102 each transmit and receive communications through the mobile telephone network 116. In other embodiments the voice server 108 may be coupled directly to the mobile telephone network 116. In other embodiments the communications network 110 also may include additional wired or wireless networks, such as an internet protocol (IP) network, a broadband communication network, a VoIP network, and/or another wired or wireless network. Thus, the reference device 104 and devices under test 102 may communicate with the voice server 108 along a communication path which includes the mobile telephone network 116 alone or in combination with one or more other networks.

Voice Quality Test Methods

Figure 2:
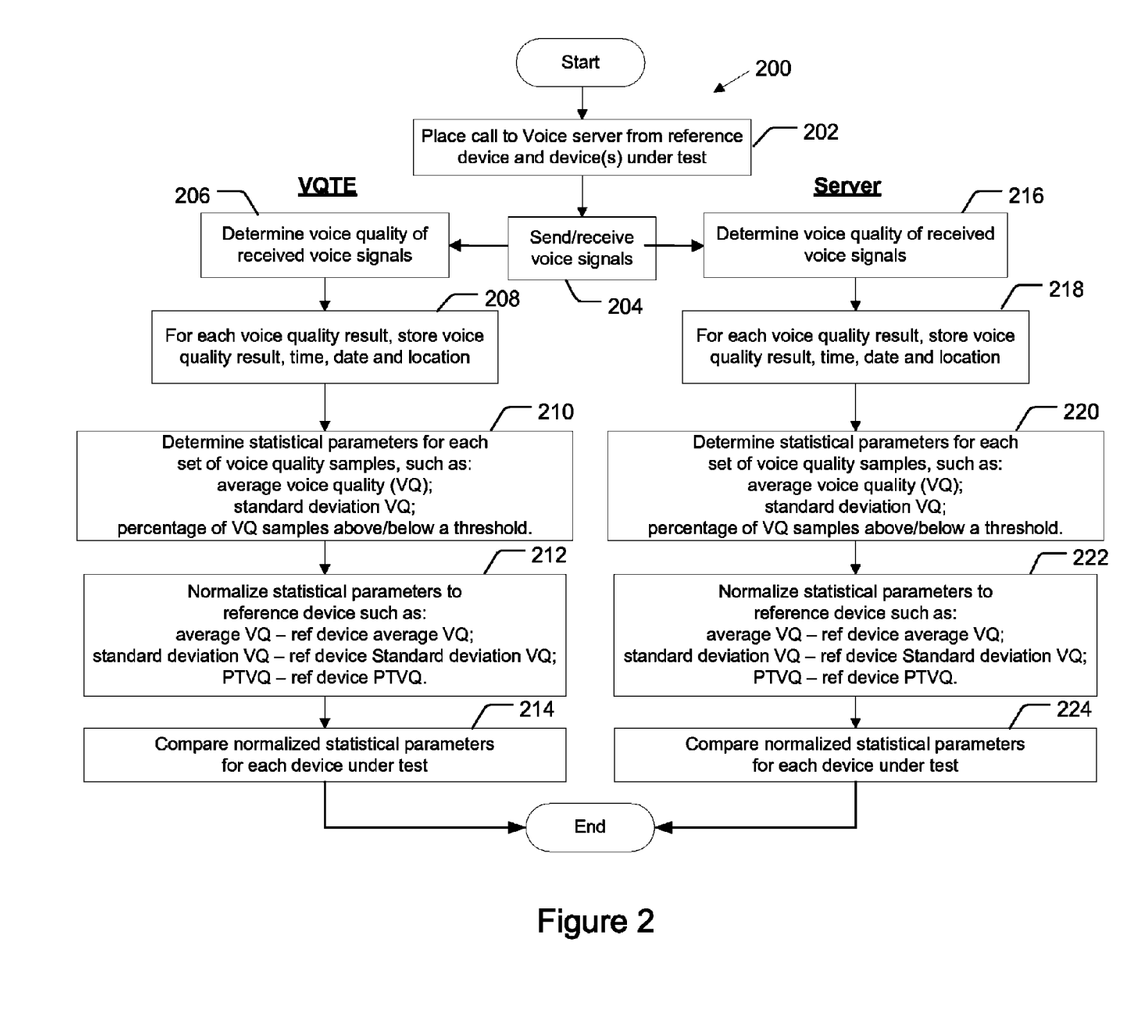
FIG. 2 illustrates an example method for determining voice quality performance according to an example embodiment of the present invention.

FIG. 2 illustrates an example process 200 for evaluating voice quality performance in a live network according to an embodiment of the present invention. During testing, the devices under test 102 and reference device 104 may be located in a vehicle (moving or stationary) within the operating area of one or more mobile telephone networks 116. For example, the devices 102, 104 may be situated within a vehicle that travels along a substantially random or a predetermined route. The devices 102, 104 may be electrically coupled to the VQTE 106 which stores the voice source files to be supplied to each device 102, 104 for transmission and stores and processes the received voice communications to determine a voice quality (e.g., MOS). At step 202, each of the devices 102, 104 establishes a communication link with the voice server 108 through the mobile telephone network 116 by placing a call to the voice server 108. The voice server 108 may have multiple landline telephone connections to receive multiple calls. The telephone calls may be placed to the voice server 108 by a test operator, or automatically in response to a command from the VQTE 106.

At step 204, voice communications may be sent from the reference device 104 and devices under test 102 to the voice server 108, and from the voice server 108 to the reference device 104 and device(s) under test 102. For example, the voice source files stored on the VQTE 106 may be reproduced (perhaps concurrently) as voice inputs to the earpiece jack of the reference device 104 and devices under test 102 and are transmitted as voice data through the mobile telephone network 116 to the voice server 108. Similarly, the voice server 108 also may include stored source voice files that are reproduced as voice input to the respective landlines and communicated as voice data through the landlines and mobile telephone network 116 to be received (perhaps concurrently) by the reference device 104 and devices under test 102.

Voice communications may be sent and received in a half-duplex mode. For example, voice communications may be sent and received in an alternating manner every five to thirty seconds and may generally model a telephone conversation. The duration period for the voice communication may vary. Accordingly, voice communications may be received at each of the reference device 104 and devices under test 102 intermittently during a given test. Similarly, voice communications may be received at the voice server 108 from each of the reference device 104 and devices under test 102 intermittently during the test.

The reference device 104 and devices under test 102 may communicate voice communications concurrently. As a result, multiple communication links may be established concurrently between the voice server 108 and the respective devices 102, 104. For a given device 102, 104 the testing may occur over the course of one telephone call. In an alternative embodiment the testing may occur over the course of multiple telephone calls between the device 102, 104 and the voice server 108.

Although the voice communications are described as being generally concurrent, one of skill in the art will appreciate that the reference device 104 and devices under test 102 need not be sending and receiving simultaneously (although they very well could) and need not establish communications links with the voice server that are precisely co-extensive. Different communication timing may be used. In addition, in this example the same voice source file(s) may be reproduced to each device 102 104 so that an objective comparison can be made when the voice quality is determined. In other embodiments, different voice files may be used. An advantage of using a common voice communication for all outgoing communications from the field is that any variations in the measured voice quality result at the receiving end are not likely to be attributable to a difference in the source communications.

As discussed, the reference device 104 and devices under test 102 are coupled to the VQTE 106. During the test, the VQTE 106 and voice server 108 store the incoming voice communications as voice communication files. At step 206, the VQTE 106 executes an algorithm on each stored voice communication file to determine the voice quality (e.g., to determine a mean opinion score (MOS)) of the incoming voice communications for each device 102, 104. Similarly, at step 216 the voice server 108 executes an algorithm on each voice communication file to determine the voice quality (e.g., to determine the MOS) of the incoming voice communications from each device 102, 104. Any suitable scoring method may be employed.

As discussed, voice communications may be transmitted between the voice server 108 and the devices 102, 104 intermittently and each voice communication may be stored as a separate file. The VQTE 106 may determine a voice quality evaluation for each incoming voice communication (whether stored as a separate file or not). The resulting voice quality assessment (e.g., MOS) for each stored voice communication is referred to as a voice quality sample. Thus, a test of a single device 102, 104 may result in a plurality of voice quality samples. Alternatively, the VTQE 106 may determine a voice quality result for each portion of a communication having a select sample length, (e.g., every 2 second clip of a 10 second voice communication received at a specific device 102, 104). Thus, at step 208 the VTQE 106 may store the voice quality sample, device location, and the time and date of the voice quality sample, along with an indication of the device 102, 104 which received the voice communication.

Similarly, at step 216 the voice server 108 may determine a voice quality evaluation for each incoming voice communication (whether stored as a separate file or not) to provide a plurality of voice quality samples for each device 102, 104. At step 218, the voice server 108 may store the voice quality sample, device location, and the time and date of the voice quality sample, along with an indication of the device 102, 104 which transmitted the voice communication.

At step 210 (and step 220), the voice quality samples of each device 102, 104 may be processed to determine one or more statistical parameters. For example, for each device 102, 104, the VQTE 106 and/or voice server 108 may determine (1) an average voice quality sample; (2) a standard deviation of the voice quality samples; (3) a mean of the voice quality samples; (4) a percentage of voice quality samples above a threshold; and (5) a percentage of voice quality samples below a threshold. The results of this processing is stored in memory of the VQTE 106 and/or voice server 108.

At step 212 (and step 222), the statistical parameters of voice quality samples for each device under test 102 may be normalized base on (or scaled or otherwise referenced to) the statistical parameters of voice quality samples for the reference device 104. In an example embodiment, the normalized average voice quality sample for a device under test 102 may be determined by computing the average voice quality sample for the device 102 minus the average voice quality sample for the reference device 104. The normalized standard deviation may be determined by computing the standard deviation of voice quality samples for the device under test 102 minus the standard deviation of voice quality samples for the reference device 104. The normalized percentage of voice quality samples above (or below) a given threshold may be determined by computing the normalized percentage of voice quality samples of a device 102 above (or below) the given threshold minus the normalized percentage of voice quality samples of the reference device 104 above (or below) the given threshold. The normalized voice quality mean may be determined by computing the mean voice quality sample for the device under test 102 minus the mean voice quality sample for the reference device 104. In other embodiments and for other data and/or statistical parameters, other normalization techniques may be used such as by determining the average voice quality sample for a device under test minus the average voice quality sample for the reference device 104 divided by the standard deviation of the average voice quality of the reference device 104 as measured over a multitude of similar voice quality tests. In yet another embodiment, other normalization techniques may include dividing the value (or statistical parameter) for the device under test 102 by the value (or statistical parameter) for the reference device. Any suitable normalization technique may be used. In addition, while this example normalizes statistical parameters, other embodiments may normalize other parameters such as throughput (e.g., when testing a data communication device).

Finally, in FIG. 1 the system is depicted as testing two devices 102 at a time and concurrently communicating voice communications with a single reference device 104. In such an implementation, if one hundred devices 102 were tested (two devices tested per test), there would be one hundred sets of voice quality samples (for the one hundred devices 102 tested) and fifty sets of voice quality samples for reference device 104 (one set for each test) that provides the baseline during each test. As will be evident to those skilled in the art, the invention may be used to concurrently test one, two, three, or more devices 102. In this embodiment, the statistical parameters of the voice quality samples for a telephone 102 are normalized based on the statistical parameters of the voice quality samples of the voice communications communicated concurrently by the reference device 104.

At steps 214 and 224, the normalized results may be compared for different mobile telephone devices 102, which may have been tested at different times and under different network and environmental conditions. Even though the test scenarios are not the same for each of the tested devices 102, the results are normalized to the results provided by the reference device 104 to thereby reduce the impact of differing network environments and conditions.

While FIG. 2 illustrates the portions of the process being performed by both the VQTE 106 and the voice server 108, data (e.g., stored voice files, the voice quality samples, and/or the statistical parameters) may be transmitted from the VQTE 106 to the server 108 (or from server 108 to the VQTE 106) and the server 108 (or the VQTE 106) may perform the processes yet remaining.

In some embodiments, it may be desirable to compare the normalized voice quality of different mobile telephone devices in various radio environments. For example, based upon weather, network load or other factors, the signal to noise ratio, bit error rate, and other radio parameters may vary. Some devices may perform very well in some radio environments, but perform poorly in others. Accordingly, it may be desirable to compare the quality of communications provided by different mobile telephone devices when operating in similar radio environments to thereby gain a more accurate and detailed comparison of different mobile telephones.

Consequently, another embodiment may include additional processes to collect radio parameter data of the network. As shown in FIG. 1, the test environment 100 may include a device 114 for collecting radio parameter data. In one example embodiment the device 114 comprises a mobile telephone that is electrically connected to the VQTE 106 and configured to collect data of one or more radio parameters of the network 116. Example radio parameter data may include, but is not limited to, signal to noise ratio, bit error rate, frame error rate, channel codec, received-signal level, downlink channel, channel type, handover statistics, and speech energy. The objective is to obtain radio parameter data which may be used to determine the radio environment during testing of a device 102 so that mobile telephone devices 102 tested in similar radio environments can be compared and so that a mobile telephone device 102 can be tested across a spectrum of different radio environments.

Figure 3:
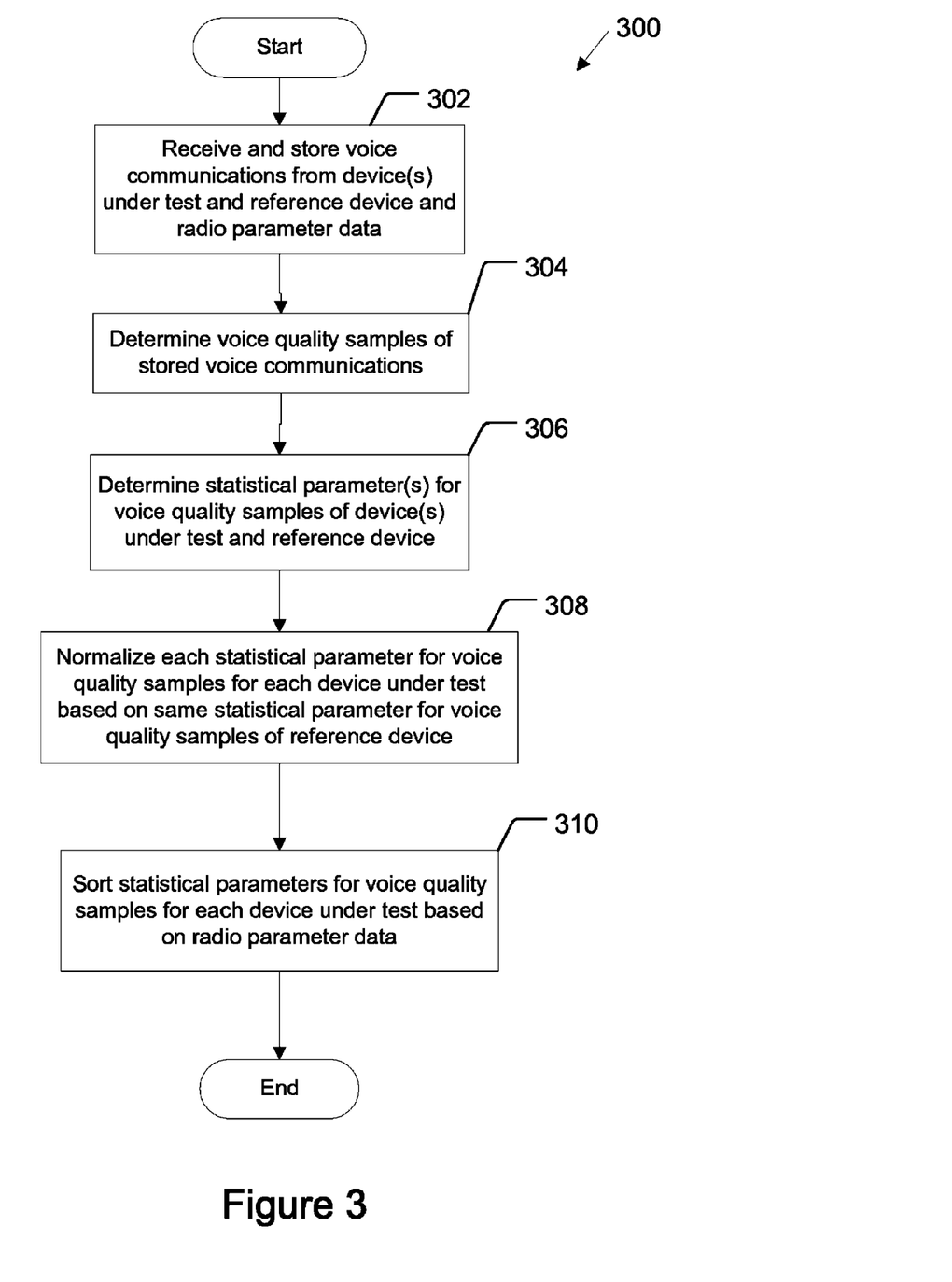
FIG. 3 illustrates another example method for determining voice quality performance according to an example embodiment of the present invention.

FIG. 3 shows a flow chart of an example process that collects radio parameter data that is stored on the VQTE 106. This example process also may include the processes of FIG. 2. As step 302, the VQTE 106 (and voice server 108) receive and store voice communications received by (transmitted from) the device(s) under test 102 and the reference device 104. In addition, radio parameter data from the radio parameter data collection device 114 is received and stored by the VQTE 106.

At step 304, the VQTE 106 and voice server 108 determine the voice quality for each voice communication to provide a plurality of voice quality samples, which may be performed as described with regard to steps 208 and 218. Next, at 306 the VQTE 106 and voice server 108 determine one or more statistical parameters (e.g., average voice quality sample, standard deviation, etc.) for the voice quality samples for the device(s) under test 102 and the reference device 104, which may be performed as described with regard to processes 210 and 220. At step 308, the VQTE 106 and voice server 108 each normalizes the one or more statistical parameters for each device under test 102 based on the one or more statistical parameters of the voice quality samples of the reference device 104. This may be performed as described with regard to processes 212 and 222.

Next, the normalized statistical parameters for each device under test 102 may be further normalized, sorted, organized, categorized, and/or summarized based on the radio environment experienced during the test at step 308. For example, by comparing the time and date of the voice quality sample with the time and date of the radio parameter data obtained, the radio parameter data for a particular voice quality sample may be determined. In other words, when the time and date are the substantially the same, then the radio parameter data may be used to categorize the corresponding voice quality samples. In practice, the radio parameter data may be stored in memory (e.g., in a database) in associate with the voice quality samples. Subsequently, the operator may perform various sorting, summarizing, normalizing, and/or categorizing of the voice quality samples of various devices based on the radio parameter data to thereby compare the statistical parameters for the voice quality sample of devices tested under similar radio conditions, (which may result in excluding from some comparisons the statistical parameters of voice quality samples of devices tested under dissimilar radio conditions).

It is worth noting that the radio parameter device 114 may be co-located with the devices under test 102 and will likely experience radio conditions similar to those experienced by the devices under test 102. However, it is possible that a particular channel (or other aspect) of communications experienced by the collection device 114 is different than that experienced by a device under test 102. Thus, for at least some radio parameters, the radio parameter data used to categorize the normalized statistical parameters may be an estimate of what was experienced by the device under test 102.

At step 310, the normalized statistical parameters for each device 102 are sorted based on the radio parameter data collected during the test of that device 102. For example, the normalized average voice quality for all the telephones 102 tested may be categorized according to the radio parameter data. The normalized statistical parameters of telephones 102 may then be compared to provide a comparison of the normalized statistical parameters of telephones 102 tested in similar radio conditions. For example, the normalized statistical parameters (e.g., average, standard deviation, mean, percentage above a threshold, percentage below a threshold, etc.) of telephones tested in radio conditions where the signal to noise ratio (SNR) is between 9 dB and 12 dB may be compared for a plurality of mobile telephones 102. Similarly, the normalized statistical parameters of telephones 102 tested in other similar radio conditions may be compared such as one or more of (1) where the SNR is within a range (e.g., between 12 dB and 15 dB), (2) where the noise floor is above a predetermined threshold, (3) where the bit error rate is above a threshold, below a threshold, or within a range, and (4) within a window (or above or below of a threshold) of one or more other radio parameters.

As discussed, the date, time, location data, and radio parameter data may be stored in association with the voice communications received via each mobile telephone (stored so that it is retrievable and sortable) on the voice server 108 or VQTE 106 to allow the operator to perform any desired comparisons based on the collected data. In some embodiments, a set of specific metrics may be used to compare devices. A rating system may be defined from these metrics to give each device under test a single score or set of scores and to facilitate one or more rankings of the tested telephones. While the above example has been described in the context of assessing the voice quality performance a mobile telephones, the invention is equally suitable for assessing the performance of data communications by wireless devices over a wireless data network such as mobile telephone network.

The normalized statistical parameters for all the devices tested may stored in memory (e.g., in a database) and sorted based on the corresponding radio parameters. After a number of devices have been tested (e.g., fifty), a threshold may be determined—that comprises an acceptable score—for each statistical category or for an aggregate statistical score. For example, for all additional devices tested, such devices must provide normalized statistical parameters for their voice quality samples that are above the bottom twentieth percentile in order to have an acceptable score (e.g., receive a "passing grade") and be permitted on the mobile network, be accepted by the manufacture, and/or otherwise be acceptable.

The invention may comprise a computer program product stored in a non-transitory tangible computer readable medium and executable by a computer to determine the quality of voice communications provided by a plurality of mobile telephones, comprising a first code segment executable to store in a memory one or more telephone voice signals received from each mobile telephone; a second code segment executable to store in a memory one or more reference device voice signals received concurrently with the telephone voice signals from a reference device substantially co-located with the mobile telephone; a third code segment executable to determine voice quality data of the telephone voice signals and of the reference device voice signals; and a fourth code segment executable to normalize the voice quality data of the telephone voice signals received from each mobile telephone based on the voice quality data of the reference device voice signals concurrently received with the telephone voice signals. The product may further comprise a fifth code segment executable to store in a memory radio parameter data for the mobile telephone determined for radio conditions during the reception of the one or more telephone voice signals; and a sixth code segment executable to sort the normalized voice quality data of the plurality of mobile telephones based on the radio parameter data.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of determining the quality of communications provided by a plurality of mobile telephones that are tested over at least some different time periods, comprising:
   receiving one or more telephone voice signals from each mobile telephone over a time period;
   concurrently with said receiving telephone voice signals from each mobile telephone, receiving one or more reference device voice signals from a reference device substantially co-located with the mobile telephone;
   determining a voice quality of the telephone voice signals;
   determining a voice quality of the reference device voice signals concurrently received with the telephone voice signals;
   determining one or more telephone statistical parameters based on the voice quality of the telephone voice signals;
   determining one or more reference device statistical parameters based on the voice quality of the reference device voice signals concurrently received with the telephone voice signals; and
   normalizing the one or more telephone statistical parameters of the telephone voice signals from each mobile telephone based on the one or more reference device statistical parameters of the reference device voice signals concurrently received with the telephone voice signals.

2. The method according to claim 1, wherein said receiving one or more telephone voice signals from each mobile telephone comprises receiving voice signals that were transmitted through a mobile telephone network by each mobile telephone.

3. The method according to claim 2, wherein said receiving one or more telephone voice signals from each mobile telephone further comprises receiving voice signals that were transmitted through the mobile telephone network to each mobile telephone.

4. The method according to claim 1, wherein said receiving one or more telephone voice signals from each mobile telephone comprises receiving voice signals that were transmitted through the mobile telephone network to each mobile telephone.

5. The method according to claim 1, further comprising:
   determining radio parameter data for each mobile telephone concurrently with said receiving one or more telephone voice signals; and
   normalizing the one or more normalized telephone statistical parameters based on the radio parameter data for the mobile telephone.

6. The method according to claim 1, further comprising:
   determining radio parameter data for the mobile telephone concurrently with said receiving one or more telephone voice signals;
   providing a comparison of the normalized telephone statistical parameters of the plurality of mobile telephones based on the radio parameter data; and
   wherein the comparison includes one or more of groups of normalized telephone statistical parameters derived from telephone voice signals having similar radio parameter data.

7. The method according to claim 1, wherein:
   at least one of the one or more telephone statistical parameters comprises an average voice quality sample;
   at least one of the reference device statistical parameters comprises an average voice quality sample; and
   wherein said normalizing the one or more telephone statistical parameters comprises determining the difference of (1) the average voice quality sample of the telephone voice signals of each mobile telephone and (2) the average voice quality sample of the reference device voice signals received concurrently.

8. The method according to claim 1, further comprising providing a comparison of the one or more normalized telephone statistical parameters of the plurality of mobile telephones.

9. A method of determining the quality of communications provided by a plurality of mobile telephones that are tested over at least some different time periods, comprising:
   receiving one or more telephone voice signals from each mobile telephone;
   storing the one or more telephone voice signals in a memory;
   concurrently with said receiving telephone voice signals from each mobile telephone, receiving one or more reference device voice signals from a reference device substantially co-located with the mobile telephone;
   storing the one or more reference device voice signals in a memory;
   determining voice quality data for the telephone voice signals;
   determining voice quality data for the reference device voice signals concurrently received with the telephone voice signals; and
   normalizing the voice quality data of the telephone voice signals from each mobile telephone based on the voice quality data of the reference device voice signals concurrently received with the telephone voice signals.

10. The method according to claim 9, wherein said receiving one or more telephone voice signals from each mobile telephone comprises receiving voice signals that were transmitted through a mobile telephone network from each mobile telephone.

11. The method according to claim 9, further comprising:
    determining radio parameter data for each mobile telephone during said receiving one or more telephone voice signals;
    providing a comparison of the normalized voice quality data of the plurality of mobile telephones based on the radio parameter data; and
    wherein the comparison excludes mobile telephones whose telephone voice signals were received in dissimilar radio conditions.

12. The method according to claim 9, wherein:
    a voice quality data for the telephone voice signals comprises a standard deviation of voice quality of the telephone voice signals;
    a voice quality data for the reference device voice signals a standard deviation of voice quality of the reference device voice signals; and
    wherein said normalizing the voice quality data comprises determining the difference of (1) the standard deviation of the voice quality of the telephone voice signals of each mobile telephone and (2) the standard deviation of voice quality of the reference device voice signals received concurrently.

13. A computer program product stored in a non-transitory tangible computer readable medium and executable by a computer to determine the quality of voice communications provided by a plurality of mobile telephones, comprising:

a first code segment executable to store in a memory one or more telephone voice signals received from each mobile telephone;

a second code segment executable to store in a memory one or more reference device voice signals received concurrently with the telephone voice signals from a reference device substantially co-located with the mobile telephone;

a third code segment executable to determine voice quality data of the telephone voice signals and of the reference device voice signals; and a fourth code segment executable to normalize the voice quality data of the telephone voice signals received from each mobile telephone based on the voice quality data of the reference device voice signals concurrently received with the telephone voice signals.

14. The product according to claim 13, further comprising:
a fifth code segment executable to store in a memory radio parameter data for each mobile telephone determined for radio conditions during the reception of the one or more telephone voice signals; and a sixth code segment executable to sort the normalized voice quality data of the plurality of mobile telephones based on the radio parameter data.

15. The product according to claim 13, wherein:
a voice quality data of the telephone voice signals comprises a telephone average voice quality;

a voice quality data of the reference device voice signals comprises a reference device average voice quality; and wherein said fourth code segment is executable to determine the difference of (1) the average voice quality data of the telephone voice signals of each mobile telephone and (2) the average voice quality data of the reference device voice signals received concurrently.

16. The product according to claim 13, further comprising a fifth code segment executable to determine whether the normalized voice quality data of telephone voice signals of a mobile telephone are above a predetermined threshold.

17. The product according to claim 13, wherein the voice quality data of the telephone voice signals comprises an average voice quality sample.

18. A method of determining the quality of communications provided by a mobile telephone in a mobile telephone network, comprising:
(a) receiving one or more telephone voice signals from a mobile telephone;
(b) concurrently with said receiving telephone voice signals from a mobile telephone, receiving one or more reference device voice signals from a reference device substantially co-located with the mobile telephone;
(c) determining voice quality samples for the telephone voice signals;
(d) determining voice quality samples for the reference device voice signals;
(e) for the voice quality samples of the telephone voice signals, determining a first statistical parameter selected from the group of (1) an average the voice quality samples; (2) a standard deviation of the voice quality samples; (3) a mean of the voice quality samples; (4) a percentage of the voice quality samples above a threshold; and (5) a percentage of the voice quality samples below a threshold;
(f) for the voice quality samples of the reference device voice signals, determining a second statistical parameter selected from the group of (1) an average the voice quality samples; (2) a standard deviation of the voice quality samples; (3) a mean of the voice quality samples; (4) a percentage of the voice quality samples above a threshold; and (5) a percentage of the voice quality samples below a threshold;
(g) normalizing the first statistical parameter based on the second statistical parameter; and
performing processes a-g for a plurality of other mobile telephone devices.

19. The method according to claim 18, wherein said receiving one or more telephone voice signals from a mobile telephone comprises receiving voice signals that were transmitted through a mobile telephone network from the mobile telephone.

20. The method according to claim 18, further comprising:
determining radio parameter data for radio conditions of the mobile telephone during said receiving one or more telephone voice signals;
providing a comparison of the normalized first statistical parameter of the plurality of mobile telephones based on the radio parameter data; and
wherein the comparison comprises one or more groupings of mobile telephones having similar radio conditions during said receiving one or more telephone voice signals.

21. The method according to claim 18, further comprising determining whether the normalized first statistical parameter of the telephone voice signals of a mobile telephone are above a predetermined threshold.

22. A method of determining the quality of communications provided by a mobile telephone in a mobile telephone network, comprising:
(a) receiving one or more telephone voice signals from a mobile telephone;
(b) concurrently with said receiving telephone voice signals from a mobile telephone, receiving one or more reference device voice signals from a reference device substantially co-located with the mobile telephone;
(c) determining voice quality samples for the telephone voice signals;
(d) determining voice quality samples for the reference device voice signals;
(e) determining a first average comprising an average of the voice quality samples of the mobile telephone;
(f)) determining a second average comprising an average of the voice quality samples of the reference device;
(g) comparing the first average with the second average to provide a first normalized average; and
performing processes a-g for a plurality of other mobile telephones.

23. The method according to claim 22, further comprising comparing the first normalized average with a normalized average of a plurality of the other mobile telephones.

24. The method according to claim 22, wherein said receiving one or more telephone voice signals from a mobile telephone comprises receiving voice signals that were transmitted through a mobile telephone network by the mobile telephone.

25. The method according to claim 22, further comprising:
determining associated radio parameter data for radio conditions of the other mobile telephones during said receiving one or more telephone voice signals;
providing a comparison of the normalized first average of the other mobile telephones based on the radio parameter data associated with each mobile telephone; and
wherein the comparison comprises one or more groupings of mobile telephones having similar associated radio parameter data.

* * * * *